(12) United States Patent
Tomar et al.

(10) Patent No.: US 9,031,736 B2
(45) Date of Patent: May 12, 2015

(54) CHANNEL DIAGNOSTIC SYSTEM FOR SENT RECEIVER

(71) Applicants: Rohit Tomar, New Delhi (IN);
Prashant Bhargava, Gurgaon (IN);
Neha Jain, Mohali (IN); Matthew B. Ruff, Austin, TX (US)

(72) Inventors: Rohit Tomar, New Delhi (IN);
Prashant Bhargava, Gurgaon (IN);
Neha Jain, Mohali (IN); Matthew B. Ruff, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 18 days.

(21) Appl. No.: 14/150,738

(22) Filed: Jan. 8, 2014

(65) Prior Publication Data

US 2014/0121886 A1 May 1, 2014

Related U.S. Application Data

(62) Division of application No. 13/530,085, filed on Jun. 21, 2012, now Pat. No. 8,645,020.

(51) Int. Cl.
| | |
|---|---|
| G06F 7/00 | (2006.01) |
| G07C 5/00 | (2006.01) |
| G01P 15/125 | (2006.01) |
| H02M 1/36 | (2007.01) |
| H04L 7/04 | (2006.01) |

(52) U.S. Cl.
CPC .............. *G07C 5/00* (2013.01); *G01P 15/125* (2013.01); *H02M 1/36* (2013.01); *H04L 7/044* (2013.01)

(58) Field of Classification Search
CPC ......... G01P 15/125; G01P 21/00; G06F 1/04; G07C 5/008; G07C 5/0808; G07C 5/085; G08C 17/00; G11C 16/04; G11C 16/12; G11C 16/30; G11C 29/021; G11C 29/028; G11C 5/145; H02M 1/36; H02M 3/07; H04L 12/2697; H04L 12/40169; H04L 2012/40215; H04L 41/0609; H04L 43/50; H04L 7/0331
USPC ................ 701/29, 31.4; 73/514.32; 327/100; 710/260; 370/242; 375/354
See application file for complete search history.

(56) References Cited

U.S. PATENT DOCUMENTS

| | | |
|---|---|---|
| 4,841,551 A | 6/1989 | Avaneas |
| 6,259,677 B1 | 7/2001 | Jain |

(Continued)

OTHER PUBLICATIONS

Blum, Philipp and Thiele, Lothar, Clock Synchronization using Packet Streams, 16th International Symposium on Distributed Computing, Toulose, FR, Oct. 28-30, 2002.

(Continued)

*Primary Examiner* — James Trammell
*Assistant Examiner* — Sanjeev Malhotra
(74) *Attorney, Agent, or Firm* — Charles Bergere

(57) ABSTRACT

A system for performing diagnostic checks on a data message transmitted from a sensor and received by a receiver includes a receiver clock tick counter, a prescaler counter, a calibration pulse detector, a nibble counter, and a calculator. The system receives first and second data messages transmitted from the sensor. Pulse widths of first and second calibration pulses of the first and second data messages, respectively, and lengths of the first and second data messages are measured using the receiver clock tick, prescaler, and nibble counters based on a compensated receiver clock signal. Thereafter, the pulse widths of the first and second calibration pulses and the lengths of the first and second data messages are compared using the calculator to perform the diagnostic checks.

9 Claims, 6 Drawing Sheets

(56) References Cited

U.S. PATENT DOCUMENTS

| | | |
|---|---|---|
| 7,761,251 B2 | 7/2010 | Bauerle |
| 2002/0011108 A1* | 1/2002 | Aoyama et al. ............ 73/514.32 |
| 2002/0140463 A1* | 10/2002 | Cheung ......................... 327/100 |
| 2004/0249526 A1* | 12/2004 | Hauer et al. .................... 701/29 |
| 2005/0086406 A1* | 4/2005 | Noha et al. .................... 710/260 |
| 2012/0155285 A1* | 6/2012 | Smart et al. ................... 370/242 |
| 2012/0195400 A1* | 8/2012 | Tomar et al. .................. 375/354 |
| 2013/0110344 A1* | 5/2013 | Merg et al. .................... 701/31.4 |

OTHER PUBLICATIONS

Aweya, Montono, Ouelette and Felske, Clock Synchronization using a Linear Process Model, International Journal of Network Management, vol. 16, Issue 1, Jan. 2002.

\* cited by examiner

CHANNEL DIAGNOSTIC SYSTEM FOR SENT RECEIVER

BACKGROUND OF THE INVENTION

The present invention relates generally to sensors, and, more particularly, to diagnostic signals generated by sensors used in automotive electronics.

Automobile electronics are becoming increasingly sophisticated. For example, automobiles include many microcontrollers that manage a variety of different functions, such as engine controls, safety systems, braking systems, etc. An engine control unit (ECU) controls functions such as engine transmission and power generation and supply based on outputs from multiple sensors associated with the corresponding automobile components. For example, a crankshaft position sensor mounted on a crankshaft transmits the angular position of the crankshaft to the ECU, based on which the ECU determines when to fire the spark plugs and inject fuel. Similarly, other sensors including pressure, speed, and temperature sensors enable the ECU to control the automobile in an effective manner.

Sensor output signals often are transmitted to the ECU using the single edge nibble transmission (SENT) protocol, where the sensor output signal includes one or more data frames (data messages) and each data frame includes a calibration pulse, a status and communication nibble, 1 to 6 data nibbles, a cyclic redundancy check (CRC) nibble, and an optional pause pulse. The ECU includes a SENT receiver unit that receives the sensor output signals and performs inter-frame diagnostic checks on the data frames to ascertain their validity. A first inter-frame diagnostic check (also known as success calibration check) is performed by comparing pulse widths of calibration pulses of two successively received data frames. If the pulse widths differ by more than 1.5625%, then either of the two successively received data frames are declared invalid and rejected. A second inter-frame diagnostic check (also known as pause pulse diagnostic check) is performed by comparing ratios of calibration pulse to data frame length of two successively received data frames. If the ratios differ by more than 1.5625%, then the latest of the two successively received data frames is declared invalid.

The above diagnostic checks require measurement of data frames lengths that are in the range of 1 millisecond (ms). Using a high frequency (HF) clock signal in the range of megahertz (MHz) requires large counters that increase the cost of the receiver unit. On the other hand, using a low frequency clock signal reduces accuracy of the measurement of the data frames length. The diagnostic checks also include several mathematical calculations including multiplications, divisions, and floating point calculations that involve large numbers and requires wide registers, which further increase the cost of the receiver unit. Additionally, the floating point calculations negatively affect circuit operating frequency. Circuitry to implement the above-mentioned diagnostic checks must be replicated for each channel through which the sensor output signals are received at the receiver unit, which increases silicon die area and receiver unit cost.

It would be advantageous to have a system for performing diagnostic checks that is accurate, does not require floating point calculations, and need not be replicated for each communication channel, and thus is less expensive, and overcomes the above-mentioned limitations of conventional diagnostic systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
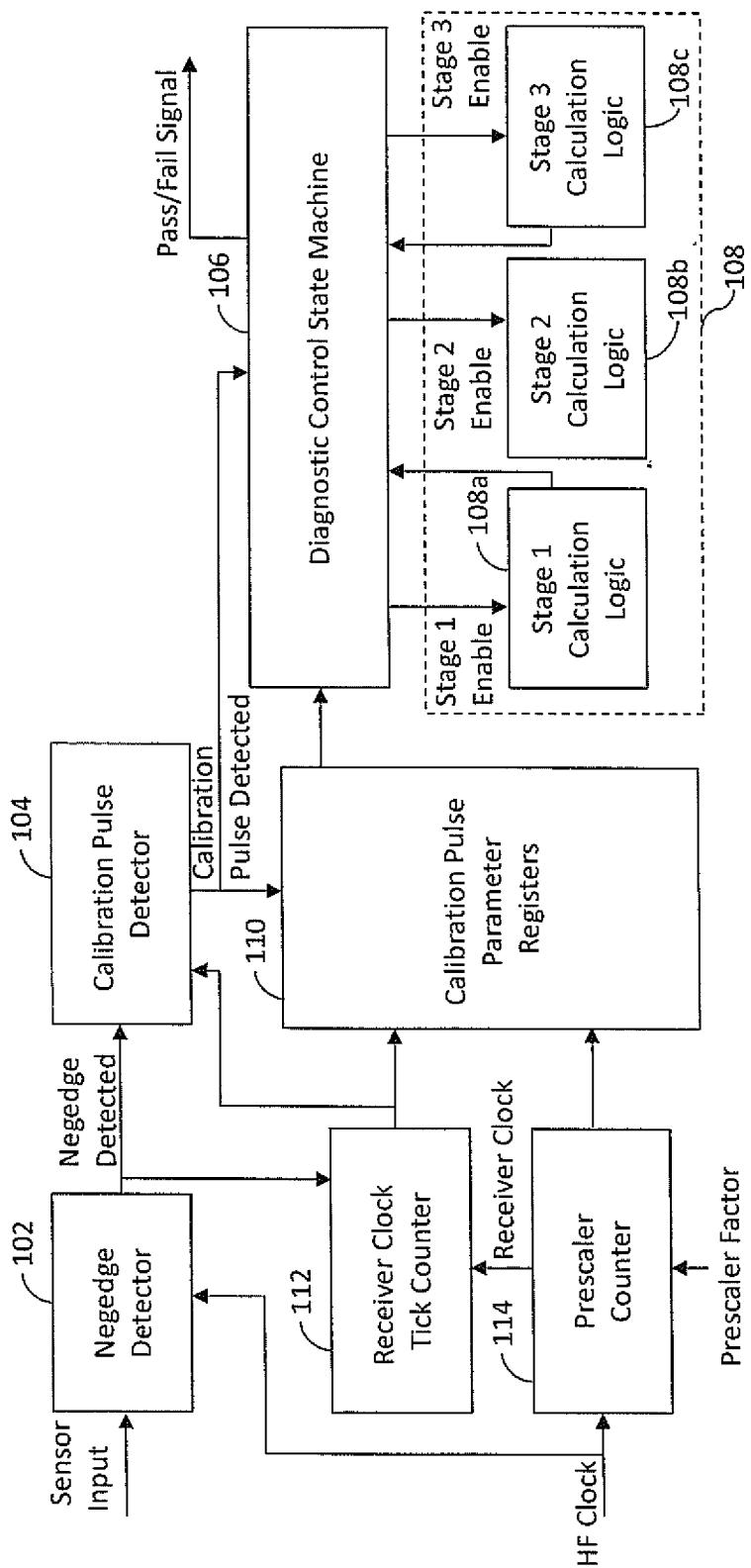
FIG. 1 is a schematic block diagram of a system for performing one or more diagnostic checks on a data message transmitted from a sensor unit to a receiver unit, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for performing at least one diagnostic check on a first data message transmitted from a sensor unit to a receiver unit is provided. The system includes a receiver clock tick counter for determining a length of a first portion of the first data message using a receiver clock signal by determining a count of clock cycles of the receiver clock signal during receipt of the first portion of the first data message. The receiver clock signal is generated using a high frequency (HF) clock signal. A prescaler counter receives the HF clock signal, generates the receiver clock signal, and determines a length of a second portion of the first data message using the HF clock signal by determining a count of clock cycles of the HF clock signal during receipt of the second portion of the first data message. The length of the second portion of the first data message is a fraction of a pulse width of the receiver clock signal. A calibration pulse detector is connected to the receiver clock tick and prescaler counters for detecting a first calibration pulse in the first data message by comparing the length of the first portion of the first data message with a valid pulse length range when a negative edge is detected in the first data message. The calibration pulse detector generates a calibration pulse detect signal when the first calibration pulse is detected in the first data message. At least one calibration pulse parameters register is connected to the receiver clock tick and prescaler counters, and the calibration pulse detector, for storing the counts of clock cycles of the receiver and HF clock signals corresponding to the first calibration pulse and a second calibration pulse transmitted from the receiver clock tick and prescaler counters upon detecting the first and second calibration pulses. The second calibration pulse corresponds to a second data message received immediately before the first data message. A diagnostic control state machine is connected to the calibration pulse detector for initiating the at least one diagnostic check on the first data message. A calculation logic is connected to the diagnostic control state machine for performing the at least one diagnostic check and generating a diagnostic check signal. The calculation logic includes a subtractor circuit, a multiplier circuit, an adder circuit, a modulus calculator circuit, a bit shifter circuit, first and second comparator circuits and an AND gate. The subtractor circuit determines a first difference that is a difference between the count of clock cycles of the receiver clock signal corresponding to the first and second calibration pulses and a second difference that is a difference between the count of clock cycles of the HF clock signal corresponding to the first and second calibration pulses. The multiplier circuit is connected to the subtractor circuit and determines a first product that is a product of a prescaler factor and the first difference and a second product that is a product of the prescaler factor and the count of clock cycles of the receiver clock signal corresponding to the second calibration pulse. The adder circuit is connected to the multiplier circuit and determines a first sum that is a sum of the first product and the second difference and a second sum that is a sum of the second product and the count of clock cycles of the HF clock signal corresponding to the second calibration pulse. The modulus calculator circuit is connected to the multiplier circuit and determines an absolute value that is a modulus of the first sum. The bit shifter circuit is connected to the modulus calculator circuit for left-shifting the absolute value of the first sum by a predetermined bit count to obtain a first shifted sum. The first comparator circuit is connected to the subtractor circuit and compares the first difference with a predetermined value to generate a first comparison signal. The second comparator circuit is connected to the bit shifter circuit and the adder circuit and compares the first shifted sum with the second sum to generate a second comparison signal. The AND gate is connected to the first and second comparator circuits and generates the diagnostic check signal based on the first and second comparison signals that indicate a pass or fail status of the first data message.

In another embodiment of the present invention, a system for performing at least one diagnostic check on a first data message transmitted from a sensor unit to a receiver unit associated with an ECU of a motor vehicle is provided. The sensor unit operates based on a sensor unit clock signal. The system includes a nibble counter for receiving the first data message and determining a nibble length of at least one nibble in the first data message based on a compensated receiver clock signal. The compensated receiver clock signal is identical to the sensor unit clock signal after compensation is performed on the receiver clock signal. An accumulator is connected to the nibble counter for receiving a value of at least one nibble length from the nibble counter and adding one or more nibble lengths to obtain a length of the first data message. A pause pulse diagnostic circuit is connected to the accumulator for performing the at least one diagnostic check on the first data message after a pause pulse is detected in the first data message and for generating a diagnostic check signal to indicate a pass or fail status of the first data message. The pause pulse diagnostic circuit includes a subtractor circuit, a modulus calculator circuit, a bit shifter circuit, an adder circuit, and a comparator circuit. The subtractor circuit is connected to the accumulator and determines a difference between the length of the first data message and a length of a second data message, in which the second data message is received immediately before the first data message. The modulus calculator circuit is connected to the subtractor circuit and determines an absolute value that is a modulus of the difference between the lengths of the first and second data messages. The bit shifter circuit is connected to the modulus calculator circuit for shifting the absolute value by a predetermined bit count to obtain a shifted absolute value. The adder circuit is connected to the accumulator and determines a sum that is a sum of the length of the first data message and a predetermined value. The comparator circuit is connected to the bit shifter circuit and adder circuit for generating the diagnostic check signal based on a comparison of the shifted absolute value with the sum of the length of the first data message and the predetermined value.

In yet another embodiment of the present invention, a method for performing first and second diagnostic checks on a data message transmitted from a sensor unit to a receiver unit associated with an ECU of a motor vehicle is provided. The sensor unit operates based on a sensor unit clock signal. The method includes receiving first and second data messages, in which the second data message is received immediately before the first data message. Counts of clock cycles of a receiver clock signal and a HF clock signal corresponding to first and second calibration pulses are determined. The receiver clock signal is generated using the HF clock signal and the first and second calibration pulses correspond to the first and second data messages, respectively. A first difference that is a difference between the count of clock cycles of the receiver clock signal corresponding to the first and second calibration pulses is generated. A second difference that is a difference between the count of clock cycles of the HF clock signal corresponding to the first and second calibration pulses is generated. A first product that is a product of a prescaler factor and the first difference and a second product that is a product of the prescaler factor and the count of clock cycles of the receiver clock signal corresponding to the second calibration pulse are generated. A first sum that is a sum of the first product and the second difference and a second sum that is a sum of the second product and the count of clock cycles of the HF clock signal corresponding to the second calibration pulse are generated. An absolute value that is a modulus of the first sum is generated. The absolute value of the first sum is shifted by a predetermined bit count to obtain a first shifted sum. The first shifted sum is compared with the second sum and the first difference is compared with a first predetermined value to generate a first diagnostic check signal.

Further, lengths of the first and second data messages are determined by determining a nibble length of at least one nibble in the first and second data messages using a compensated receiver clock signal, in which the compensated receiver clock signal is identical to the sensor unit clock signal after compensation is performed on the receiver clock signal. A third difference that is a difference between the lengths of the first and second data messages is generated. An absolute value that is a modulus of the third difference is generated and the absolute value is shifted by the predetermined bit count to obtain a shifted absolute value. A third sum that is a sum of the length of the first data message and a predetermined value is generated. The shifted absolute value is then compared with the third sum to generate a second diagnostic check signal.

Various embodiments of the present invention provide a system and method for performing diagnostic checks on a data message transmitted from a sensor unit to a receiver unit of an ECU of a motor vehicle. The system receives first and second data messages transmitted by the sensor unit. Pulse widths of first and second calibration pulses corresponding to the first and second data messages are measured using a receiver clock tick counter and a prescaler counter. The receiver clock tick and prescaler counters count clock cycles of a receiver clock signal and a HF clock signal while receiving the first and second calibration pulses to measure the pulse widths thereof. The receiver clock signal is derived by reducing the frequency of the HF clock signal by a prescaler factor that is greater than 1. As a result, size of counter and registers required for counting and storing the count of clock cycles is considerably reduced. Additionally, using a combination of high and low frequency clock signals for measuring the pulse widths ensures that the pulse widths are measured accurately. Mathematical calculations including multiplication, addition, subtraction and bit-shifting are performed on the counts of the clock cycles of the receiver and HF clock signals during the diagnostic checks. The mathematical calculations do not include any floating point calculations and, thereby reducing the time required for performing the diagnostic checks and corresponding software overhead. The receiver clock signal is compensated by keeping its frequency equal to that of the sensor unit clock signal which results in the first and second calibration pulses having identical measured pulse widths. Thus, while measuring lengths of the first and second data messages (as required by pause pulse diagnostic check) using the compensated receiver clock, the pulse widths of the first and second calibration pulses can be excluded which results in a reduction in the size of counter and registers used to count and store the lengths of the first and second data messages.

The system for performing diagnostic checks may be configured for use in a multiple communication channel system in which the receiver unit receives more than one sensor output signal from multiple sensor units. The fast and efficient operation of the system allows the system to perform diagnostic checks in a serial or per channel manner in a multiple communication channel environment. Prioritization logic is used as an interface between the system and the channels, and pipelines the diagnostic checks for the channels based on one or more predefined criteria. The system does not need to be replicated for each channel, which further reduces cost of the receiver unit.

Referring now to FIG. 1, a schematic diagram depicting a system 100 for performing one or more diagnostic checks on a data message transmitted from a sensor unit to a receiver unit in accordance with an embodiment of the present invention is shown. In one embodiment, the receiver unit is coupled to a microcontroller or an ECU of a motor vehicle. The system 100 includes a negative edge detector 102, a calibration pulse detector 104, a diagnostic control state machine 106, a plurality of calculation logic stages including first through third calculation logic stages 108a, 108b, and 108c (referred to collectively as calculation logic stage 108), calibration pulse parameter registers 110, a receiver clock tick counter 112, and a prescaler counter 114.

The negative edge detector 102 receives a sensor output signal that includes a first data message. The negative edge detector 102 begins to receive the first data message when a first negative edge is detected in the sensor output signal. Upon detecting the first negative edge, the receiver clock tick and prescaler counters 112 and 114 are reset to zero and signaled to start counting by the negative edge detector 102. The receiver clock tick counter 112 measures a length of a first portion of the first data message by counting clock ticks (i.e., clock pulses) of a receiver clock signal and the prescaler counter 114 measures a length of a second portion of the first data message by counting clock ticks (i.e., clock pulses) of a high frequency (HF) clock signal. As used herein, high frequency means in the MHz range. The minimum clock frequency is dependent on the fastest sensor clock so, for a 3 us sensor clock, the HF clock would be above 50 MHz. For slower clocks, it can less but it will remain in the MHz region. In an embodiment of the present invention, the HF clock signal is a system clock signal of a system-on-a-chip (SoC) associated with the receiver unit.

The receiver clock signal is derived from the HF clock signal and generated by the prescaler counter 114 based on a prescaler factor (X) that is provided externally. In an embodiment of the present invention, the prescaler factor is a numeric value greater than 1. The prescaler counter 114 generates the receiver clock signal by counting a number of clock cycles of the HF clock signal and generating a clock edge of the receiver clock signal at each instance when the count becomes equal to the prescaler factor value. Thus, the receiver clock signal has a reduced frequency, which further reduces size of the receiver clock tick counter 112.

Upon detecting the first negative edge, counts of clock cycles of the receiver and HF clock signals that are stored in the receiver clock tick and prescaler counters 112 and 114 and correspond to a second data message received immediately before the first data message, are stored into the calibration pulse parameter registers 110. This frees up the receiver clock tick and prescaler counters 112 and 114 to record the length of the first and second portions of the first data message.

After detecting the first negative edge, the negative edge detector 102 initiates the detection of the occurrence of a second negative edge in the first data message. Upon detecting the second negative edge, the negative edge detector 102 triggers the calibration pulse detector 104, based on which the calibration pulse detector 104 compares the length of the first portion stored in the receiver clock tick counter 112 with a valid pulse length range and detects occurrence of a calibration pulse. Theoretically, the length of the first portion ($P_1$) is given by:

$$P_1 = A(n+1) * X \quad (1)$$

where, $A(n+1)$=Count of clock cycles of the receiver clock signal (receiver clock tick counter parameter) between two negative edges; and X=Prescaler factor When the first portion (i.e., $P_1$) equals the valid pulse length range, the calibration pulse detector 104 signals detection of a calibration pulse and transfers values stored in the receiver clock tick and prescaler counters 112 and 114 to the calibration pulse parameter registers 110. In an embodiment of the present invention, the valid pulse length range in accordance with the SENT protocol is 56+/−20% ticks. Upon detecting the calibration pulse, the negative edge detector 102 resets the receiver clock tick and prescaler counters 112 and 114. Also, upon detecting the first calibration pulse, the calibration pulse detector 104 signals the diagnostic control state machine 106 to begin a first diagnostic check, i.e., the successive calibration check on the first data message. The diagnostic control state machine 106 reads the receiver clock tick counter parameters ($A(n)$ and $A(n+1)$) and the prescaler counter parameters ($B(n)$ and $B(n+1)$) corresponding to the first and second data messages from the calibration pulse parameter registers 110. The diagnostic control state machine 106 transmits the above parameters to the calculation logic stages 108 that perform the first diagnostic check.

After the first diagnostic check is performed, the calculation logic stages 108 generate a diagnostic check signal indicating a pass/fail status of the first data message. If the first data message fails the first diagnostic check, it is declared invalid and rejected by the receiver unit.

Figure 2:
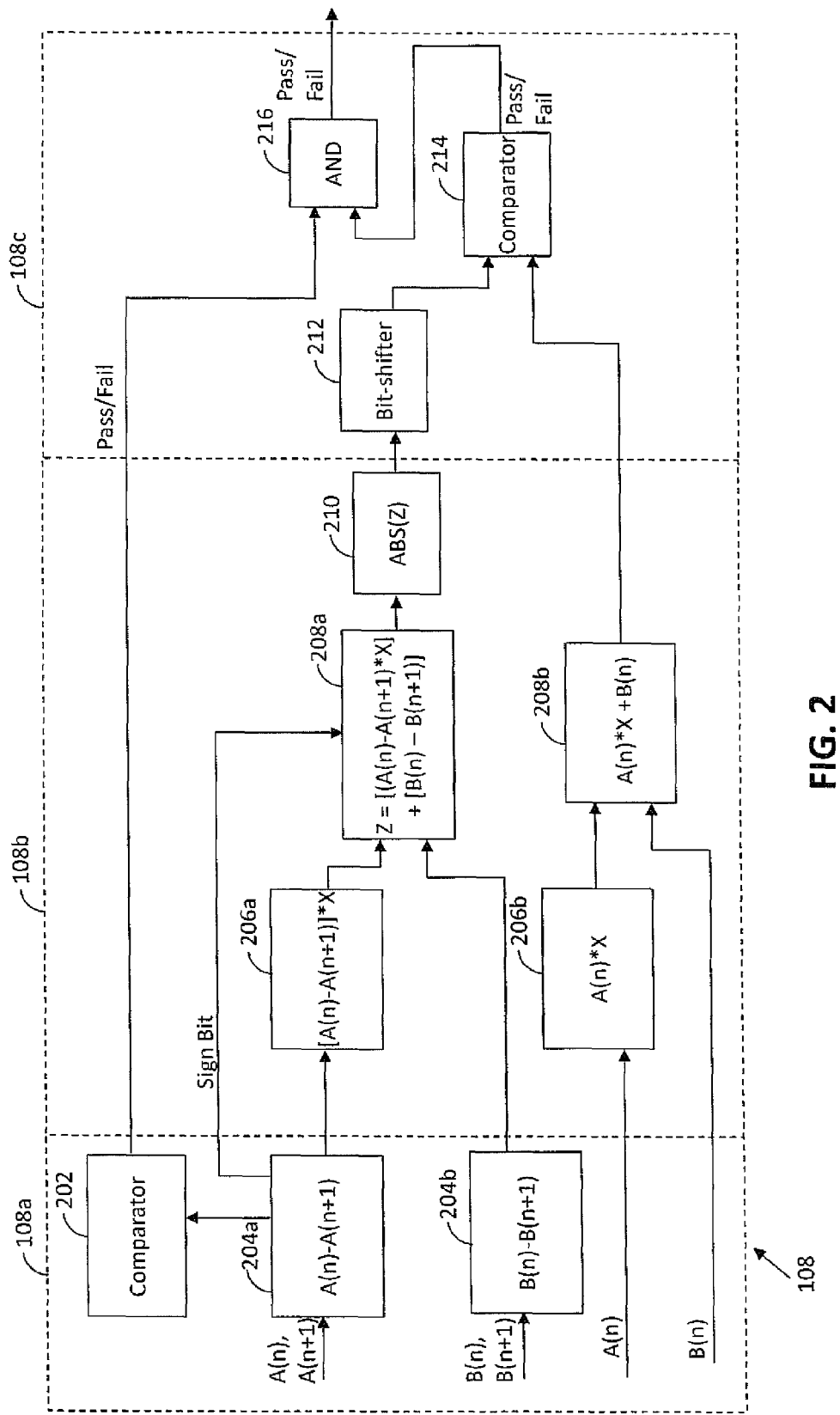
FIG. 2 is a schematic block diagram of a calculation logic unit of the diagnostic system of FIG. 1, in accordance with an embodiment of the present invention.

Referring now to FIG. 2, a schematic diagram depicting the calculation logic stages 108 in accordance with an embodiment of the present invention is shown. The first calculation logic stage 108a includes a first comparator circuit 202, and first and second subtractor circuits 204a and 204b. The second calculation logic stage 108b includes first and second multiplier circuits 206a and 206b, first and second adder circuits 208a and 208b, and a first modulus calculator circuit 210. The third calculation logic stage 108c includes a bit shifter circuit 212, a second comparator circuit 214, and a logic gate 216, which in this embodiment is an AND gate.

The first subtractor circuit 204a generates a first difference A(n)−A(n+1) between the receiver clock tick counter parameters A(n) and A(n+1) corresponding to first and second calibration pulses. Additionally, a sign bit indicating a sign of the first difference is also generated by the first subtractor circuit 204a. The second subtractor circuit 204b generates a second difference B(n)−B(n+1) between the prescaler counter parameters B(n) and B(n+1) corresponding to the first and second calibration pulses and transmits the second difference to the first adder circuit 208a. In an embodiment of the present invention, the first and second subtractor circuits 204a and 204b may be replaced by a single subtractor circuit 204. The first comparator circuit 202 receives the first difference and compares the first difference with a predetermined value to generate a first comparison signal. In accordance an embodiment of the present invention, the predetermined value is chosen as 3. If the first difference is greater than or equal to 3 then lengths of the first and second calibration pulses differ by more than 1.5625%. Therefore, if the first comparator circuit 202 determines that the first difference is greater than or equal to 3, it assigns logic low state to the first comparison signal that indicates a fail status else it keeps the first comparison signal at a logic high state indicating a pass status. The first comparison signal is then transmitted to the AND gate 216. In an embodiment of the present invention, the AND gate 216 may be replaced by an OR gate so that logic low state of the first comparison signal represents a pass status and logic high state of the first comparison signal represents a fail status.

The first multiplier circuit 206a generates a first product (A(n)−A(n+1))*X that is a product of the prescaler factor X and the first difference A(n)−A(n+1) and the second multiplier circuit 206b generates a second product (A(n)*X that is a product of the prescaler factor X and the receiver clock tick parameter A(n) corresponding to the second calibration pulse. In an embodiment of the present invention, the first and second multiplier circuits 206a and 206b may be replaced by a single multiplier circuit 206. The first product is transmitted to the first adder circuit 208a that determines a first sum that is a sum of the first product and the second difference (A(n)−A(n+1))*X+(B(n)−B(n+1)). Thereafter, the first sum is transmitted to the first modulus calculator circuit 210 that calculates an absolute value of the first sum ABS ((A(n)−A(n+1))*X+(B(n)−B(n+1))) and transmits the absolute value to the bit shifter circuit 212. The second product is transmitted to the second adder circuit 208b that generates a second sum A(n)*X+B(n) that is a sum of the second product and the prescaler counter parameter B(n) corresponding to the second calibration pulse. In an embodiment of the present invention, the first and second adder circuits 208a and 208b may be replaced by a single adder circuit 208. The second sum is transmitted to the second comparator circuit 214.

The bit shifter circuit 212 left-shifts the absolute value of the first sum by a predetermined bit count to obtain a first shifted sum (ABS((A(n)−A(n+1))*X+(B(n)−B(n+1))))*64. In an embodiment of the present invention, the predetermined bit count is 6 bits. The first shifted sum is transmitted to the second comparator circuit 214 that compares the first shifted sum with the second sum to generate a second comparison signal. If the second comparator circuit 214 determines that the first sum is greater than the second sum, the second comparison signal is assigned a logic low state indicating a fail status else it is assigned a logic high state indicating a pass status. The second comparison signal is transmitted to the AND gate 216 that generates the diagnostic check signal based on the first and second comparison signals. If the first and second comparison signals have logic high state then the diagnostic check signal generated by the AND gate 216 has a logic high state indicating pass status of either of the first and second data messages. Thereafter, the first and second data messages may be stored into a system memory (not shown) for further processing. If either of the first or second comparison signals have logic low state, the diagnostic check signal has a logic low state indicating a fail status of either of the first and second data messages which are then declared invalid and are rejected (i.e., not stored in the system memory).

Figure 3:
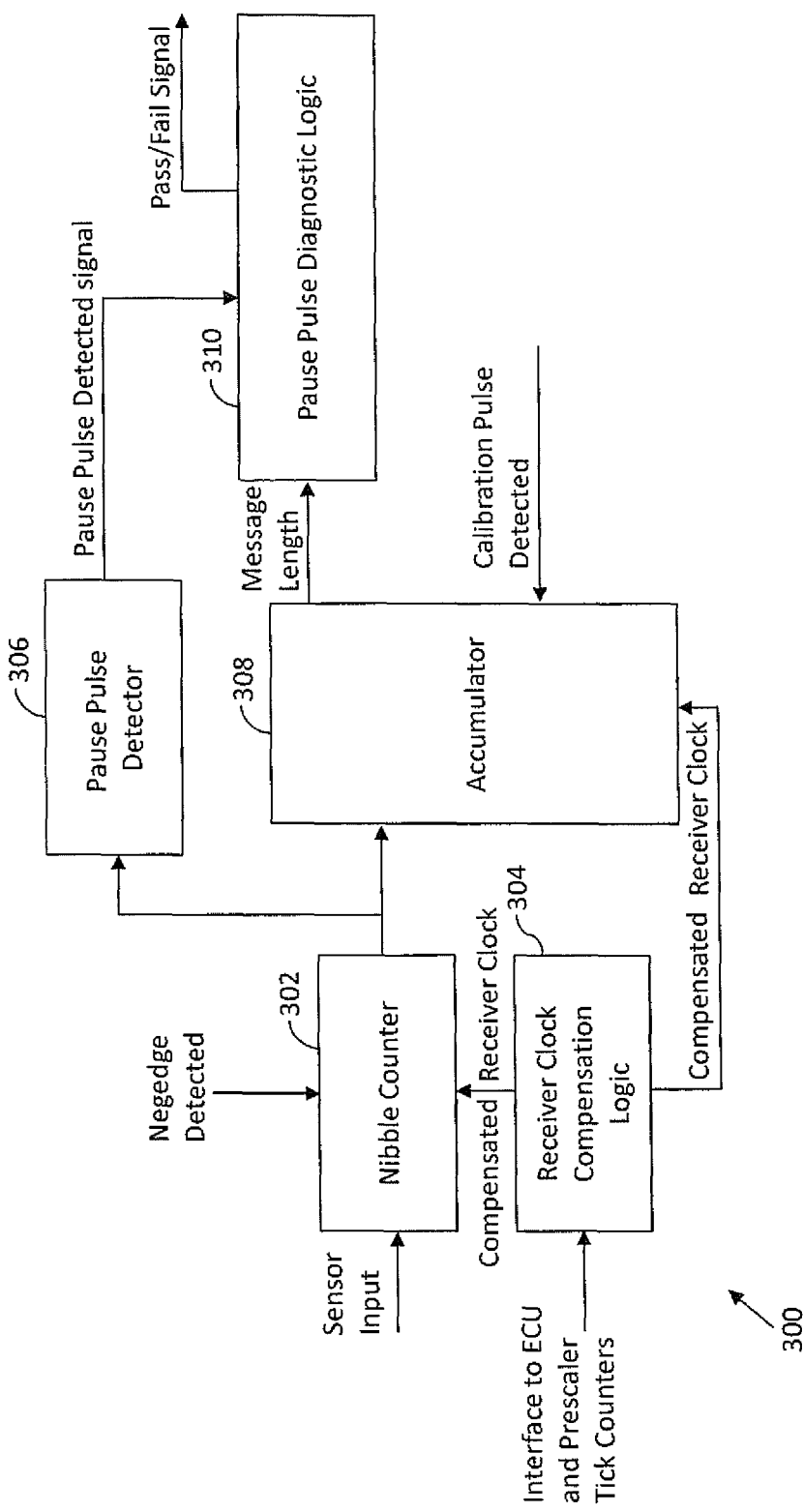
FIG. 3 is a schematic block diagram of a diagnostic system for checking a data message transmitted from the sensor unit to the receiver unit, in accordance with another embodiment of the present invention.

Referring now to FIG. 3, a schematic diagram depicting a system 300 for performing one or more diagnostic checks on a data message transmitted from a sensor unit to a receiver unit associated with an ECU of a motor vehicle, in accordance with another embodiment of the present invention, is shown. The system 300 includes a nibble counter 302, a receiver clock compensation logic 304, a pause pulse detector 306, an accumulator 308, and a pause pulse diagnostic circuit 310. FIG. 3 will be explained below in conjunction with FIGS. 1 and 2.

A sensor output signal including a first data message is transmitted from a sensor unit based on a sensor unit clock signal and received by the nibble counter 302. Upon detecting a first calibration pulse, the nibble counter 302 initiates measurement of nibble lengths of one or more nibbles in the first data message and the accumulator 308 is reset. The nibble counter 302 measures the nibble length by counting clock ticks of a compensated receiver clock signal. The compensated receiver clock signal is generated by the receiver clock compensation logic 304 and is identical to the sensor unit clock signal, which results in the first and second calibration pulses having identical pulse widths. After the counting is started, the nibble counter 302 is reset when a negative edge is detected in each of the first and second data messages. Upon detecting the negative edge, a measured nibble length stored in the nibble counter 302 is transmitted to the accumulator 308. The accumulator 308 adds the nibble length to a sum of nibble lengths corresponding to nibbles (associated with the first data message) received previously. The accumulator 308 accumulates the nibble lengths until a first pause pulse is detected by the pause pulse detector 306. Upon detecting the first pause pulse, the sum of the nibble lengths (i.e., a length of the first data message excluding the first calibration pulse) stored in the accumulator 308 is stored into a message length register (not shown) and the pause pulse detector 306 signals the pause pulse diagnostic circuit 310 to initiate a second diagnostic check, i.e., a pause pulse diagnostic check. The pause pulse diagnostic circuit 310 performs the second diagnostic check on the first data message to generate a pass/fail status signal indicating a pass or fail status of the first data message.

Figure 4:
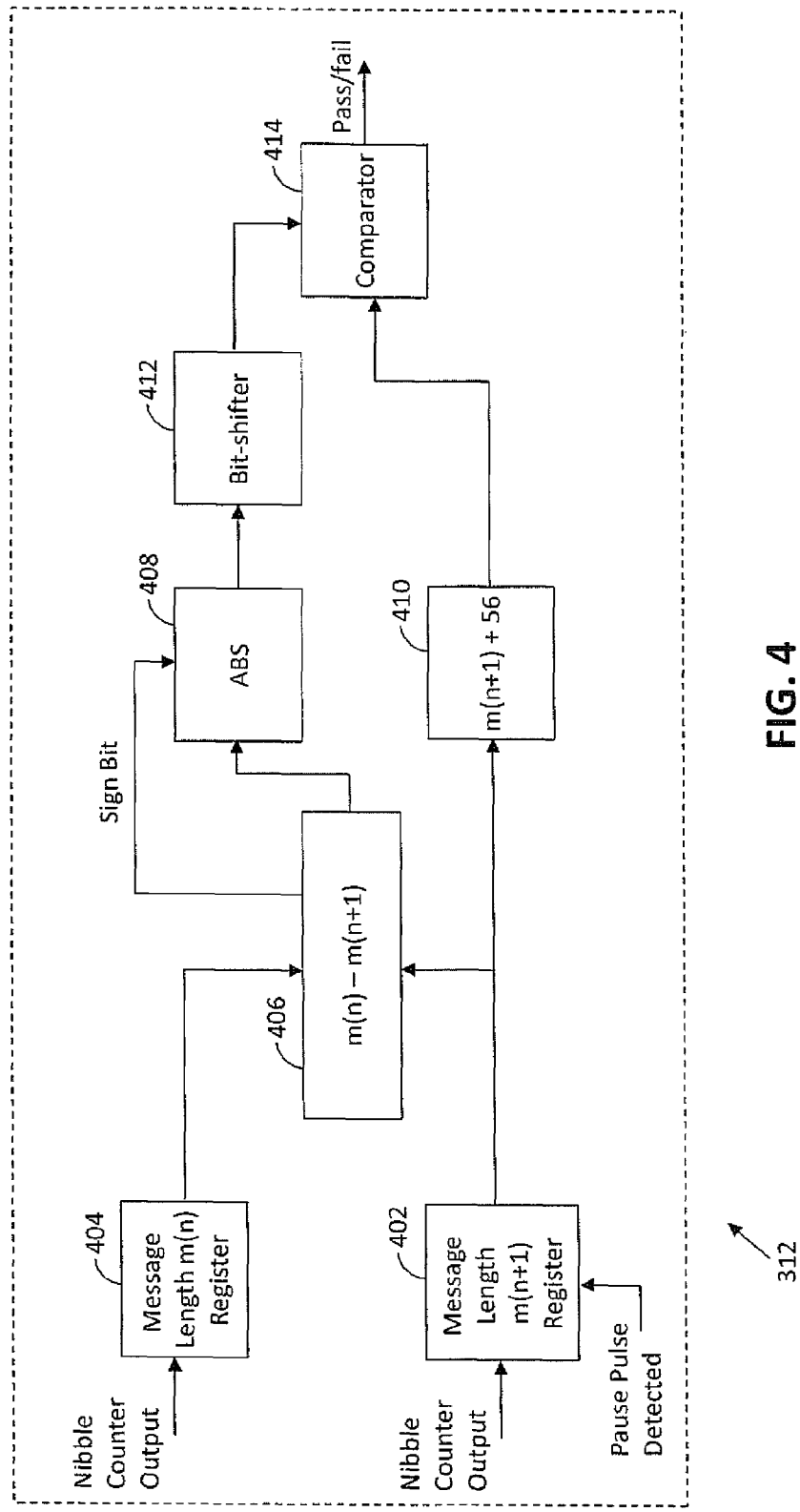
FIG. 4 is a schematic block diagram of pause pulse diagnostic circuit of the diagnostic system of FIG. 1, in accordance with another embodiment of the present invention.

Referring now to FIG. 4, a schematic diagram depicting the pause pulse diagnostic circuit 310 in detail, in accordance with another embodiment of the present invention, is shown. The pause pulse diagnostic circuit 310 includes first and second message length registers 402 and 404, a subtractor circuit 406, a second modulus calculator circuit 408, an adder circuit 410, a bit shifter circuit 412, and a comparator circuit 414.

The first and second message length registers 402 and 404 store lengths of the first and second data messages by excluding corresponding first and second calibration pulses. Measuring the lengths of the first and second data messages based on the compensated receiver clock signal enables performing the second diagnostic check by using the lengths of the first and second data messages by excluding pulse widths of the corresponding first and second calibration pulses. In accordance with the SENT protocol, the first and second calibration pulses have identical number of the sensor unit clock signal ticks, i.e., 56. However, due to design anomalies and environmental conditions, the frequency of the receiver clock signal does not exactly match the frequency of the sensor unit clock signal. As a result, the first and second calibration pulses may be measured to have differing numbers of ticks. Therefore, measuring the pulse widths of the first and second calibration pulses based on the compensated receiver clock signal results in the first and second calibration pulses having identical or substantially identical pulse widths. This eliminates the need to consider the first and second calibration pulses in the lengths of the first and second data messages and reduces sizes of the nibble counter 302, the accumulator 308, and the first and second message length registers 402 and 404. Also, the need to compare ratios of calibration pulse length to data message length (as specified by SENT protocol for the pause-pulse diagnostic check) is eliminated.

The lengths of the first and second data messages m(n) and m(n+1) are transmitted to the subtractor circuit 406. The subtractor circuit 406 generates a first difference m(n)−m(n+1) that is a difference between the lengths of the first and second data messages and determines a sign-bit of the first difference. The subtractor circuit 406 transmits the first difference to the second modulus calculator circuit 408. The second modulus calculator circuit 408 uses the sign bit and generates an absolute value ABS(m(n)−m(n+1)) that is a modulus of the first difference and transmits the absolute value to the bit shifter circuit 412. The bit shifter circuit 412 shifts the absolute value by a predetermined bit count to generate a shifted absolute value. In an embodiment of the present invention, the predetermined-bit count is equal to 6 bits and the shifted absolute value generated by the second modulus calculator circuit 408 is ABS(m(n)−m(n+1))*64. The bit shifter circuit 412 transmits the shifted absolute value to the comparator circuit 414. Additionally, the length of the first data message is transmitted to the adder circuit 410. The adder circuit 410 generates a first sum that is a sum of the length of the first data message m(n+1) and a predetermined value. In an embodiment of the present invention, the predetermined value is 56. The adder circuit 410 transmits the first sum to the comparator circuit 414. The comparator circuit 414 compares the first sum with the shifted absolute value to generate a pass/fail status that indicates whether the lengths of the received data messages are uniform or not.

Figure 5A:
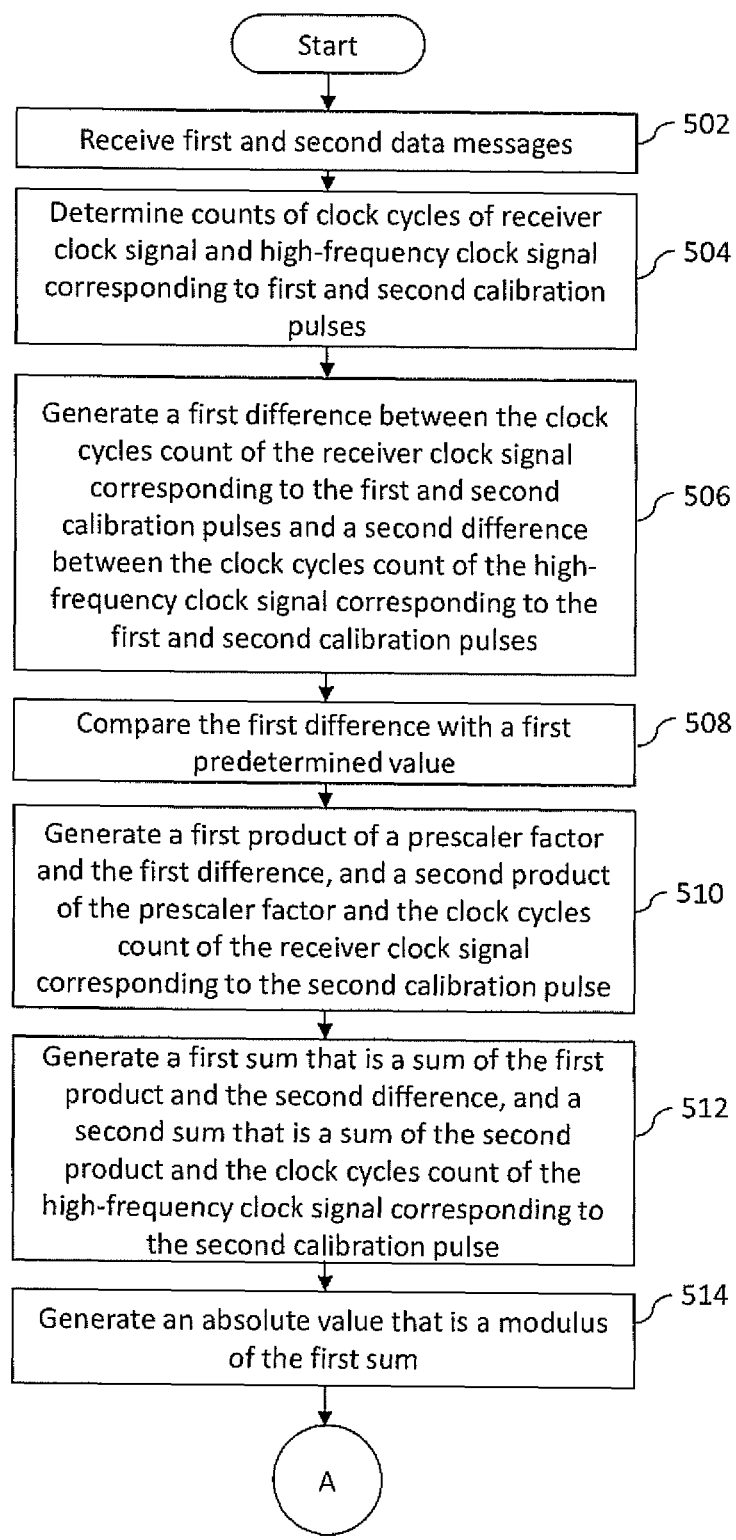
FIGS. 5A and 5B are flowcharts depicting a method for performing one or more diagnostic checks on the data message, in accordance with an embodiment of the present invention.
Figure 5B:
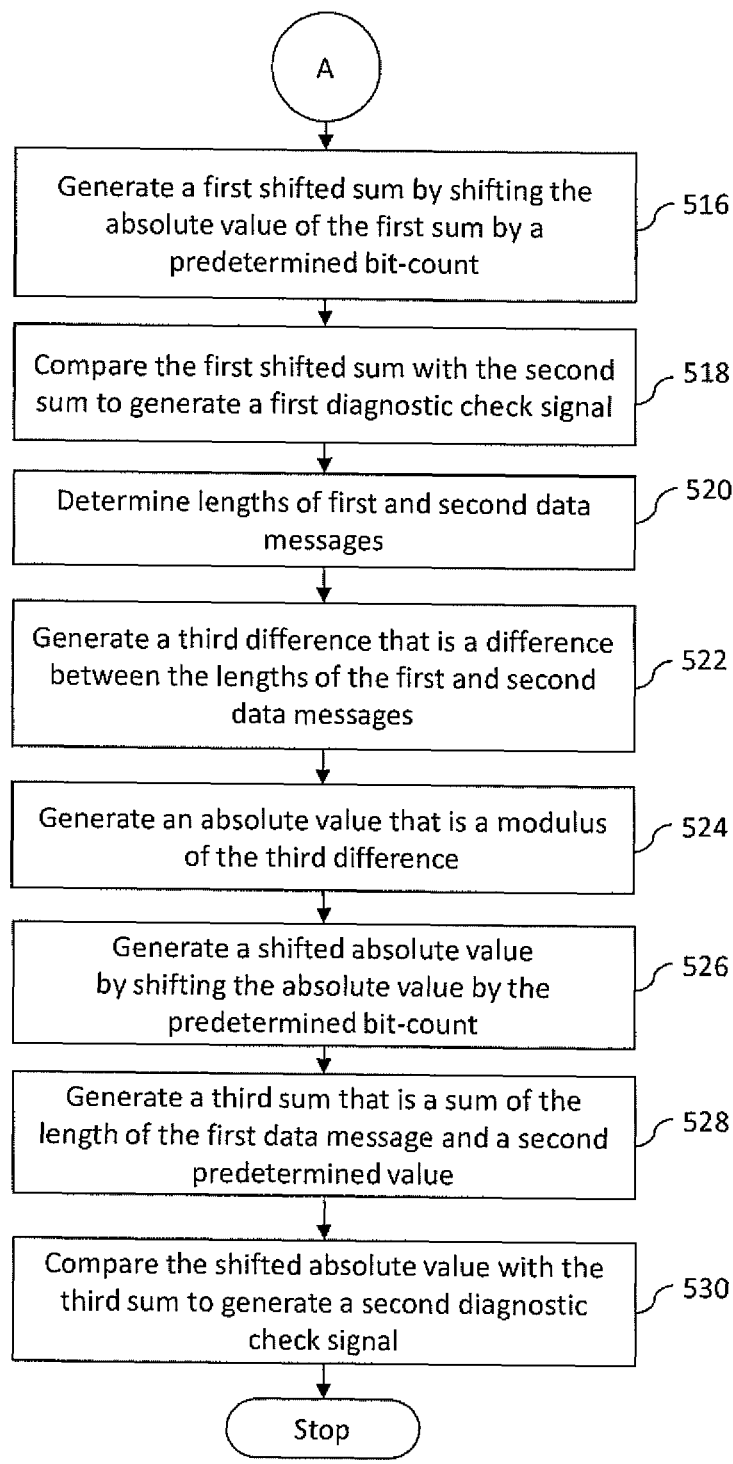

Referring now to FIGS. 5A and 5B, flowcharts depicting a method for performing first and second diagnostic checks on a data message transmitted from a sensor unit to a receiver unit associated with a controller of a motor vehicle, in accordance with an embodiment of the present invention, is shown. FIGS. 5A and 5B are explained in conjunction with FIGS. 1-4.

At step 502, first and second data messages are received at the receiver unit. In an embodiment of the present invention, the first and second data messages are transmitted using SENT protocol from the sensor unit (based on a sensor unit clock signal) to the receiver unit associated with an ECU. At step 504, counts of clock cycles of a receiver clock signal and a HF clock signal corresponding to first and second calibration pulses are determined by the receiver clock tick and prescaler counters 112 and 114, respectively. The receiver clock signal is generated using the HF clock signal by the prescaler counter 114. Further, the first and second calibration pulses correspond to the first and second data messages, respectively. At step 506, a first difference that is a difference between the count of clock cycles of the receiver clock signal corresponding to the first and second calibration pulses is generated by the first subtractor circuit 204a. A second difference that is a difference between the count of clock cycles of the HF clock signal corresponding to the first and second calibration pulses is generated by the second subtractor circuit 204b. At step 508, the first difference is compared with a first predetermined value to determine a validity of the first data message by the first comparator circuit 202. If at step 508, it is determined that the first difference is greater than or equal to the first predetermined value, then a fail status signal is generated indicating that the first data message is invalid and needs to be rejected. However, if at step 508, it is determined that the first difference is less than the first predetermined value, a pass status signal is generated and step 510 is executed. In an embodiment of the present invention, the first predetermined value is 3. At step 510, a first product that is a product of a prescaler factor and the first difference is generated by the first multiplier circuit 206a. Further, a second product that is a product of the prescaler factor and the count of clock cycles of the receiver clock signal corresponding to the second calibration pulse is generated by the second multiplier circuit 206b. At step 512, a first sum that is a sum of the first product and the second difference and a second sum that is a sum of the second product and the count of clock cycles of the HF clock signal corresponding to the second calibration pulse are generated. At step 514, an absolute value that is a modulus of the first sum is determined by the first modulus calculator circuit 210. At step 516, the absolute value of the first sum is left-shifted by a predetermined bit count to obtain a first shifted sum by the bit shifter circuit 212. In an embodiment of the present invention, the predetermined bit count is 6 bits. At step 518, the first sum is compared with the second sum by the second comparator circuit 214 to generate a first diagnostic check signal. If at step 518 it is determined that the first sum is greater than the second sum, a fail status signal is generated indicating that the first data message is invalid and needs to be rejected. However, if at step 518 it is determined that the first sum is less than or equal to the second sum then a pass status signal is generated and the first data message is used for further processing by the ECU.

At step 520, lengths of the first and second data messages are determined by the nibble counter 302. The lengths of the first and second data messages are determined by determining lengths of the multiple nibbles in the first and second data messages using a compensated receiver clock signal. The compensated receiver clock signal is identical to the sensor unit clock signal and is generated by the receiver clock compensation logic 304. At step 522, a third difference that is a difference between the lengths of the first and second data messages is generated by the subtractor circuit 406. At step 524, an absolute value that is a modulus of the third difference is generated by the second modulus calculator circuit 408. At step 526, the absolute value is shifted by the predetermined bit count by the bit shifter circuit 412 to obtain a shifted absolute value. In an embodiment of the present invention, the predetermined bit count is 6 bits. At step 528, a third sum that is a sum of the length of the first data message and a second predetermined value is generated by the adder circuit 410. In an embodiment of the present invention, the second predetermined value is 56. At step 530, the shifted absolute value is compared with the third sum to generate a second diagnostic check signal indicating a pass/fail status of the first data message.

The system of the present invention operates in a fast and efficient manner (due to elimination of the floating point stage and due the use a high frequency clock) and hence, when the receiver unit receives multiple sensor output signals through multiple serial communication channels, the system may be used for performing diagnostic checks in succession for each communication channel without the need for replicating the system for each channel. Prioritization logic (not shown) may be used between the system and the multiple communication channels. The prioritization logic operates based on an algorithm that pipelines the diagnostic checks for the multiple communication channels based on one or more predefined criteria. Thereafter, the checks are performed in succession. In an embodiment of the present invention, the system may be implemented in an 8-communication channel environment. In another embodiment of the present invention, the system may be implemented in a 10-communication channel environment.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for performing at least one diagnostic check on a first data message transmitted from a sensor unit to a receiver unit associated with an engine control unit (ECU), wherein the sensor unit operates based on a sensor unit clock signal, comprising:
   a nibble counter for receiving the first data message and determining a nibble length of at least one nibble of the first data message based on a compensated receiver clock signal, wherein the compensated receiver clock signal is substantially identical to the sensor unit clock signal;
   an accumulator, connected to the nibble counter, for receiving the nibble length from the nibble counter and adding one or more nibble lengths to obtain a length of the first data message; and
   a pause pulse diagnostic circuit, connected to the accumulator, for performing the at least one diagnostic check on the first data message after a pause pulse is detected in the first data message and generating a diagnostic check signal that indicates at least one of pass and fail status of the first data message, wherein the pause pulse diagnostic circuit comprises:
      a subtractor circuit, connected to the accumulator, for determining a difference between the length of the first data message and a length of a second data message, wherein the second data message is received immediately before the first data message;
      a modulus calculator circuit, connected to the subtractor circuit, for determining an absolute value that is a modulus of the difference between the lengths of the first and second data messages;
      a bit shifter circuit, connected to the modulus calculator circuit, for shifting the absolute value by a predetermined bit count to obtain a shifted absolute value;
      an adder circuit, connected to the accumulator, for determining a sum of the length of the first data message and a predetermined value; and
      a comparator circuit, connected to the bit shifter circuit and the adder circuit, for comparing the shifted absolute value with the sum of the length of the first data message and the predetermined value, and generating the diagnostic check signal.

2. The system of claim 1, further comprising a pause pulse detector, connected to the nibble counter and the pause pulse diagnostic circuit, for detecting the pause pulse in at least one of the first and second data messages.

3. The system of claim 2, further comprising at least one message length register, connected to the accumulator, for storing the lengths of the first and second data messages.

4. The system of claim 3, wherein the lengths of the first and second data messages are stored in the message length register from the accumulator by the pause pulse detector when the pause pulse is detected in at least one of the first and second data messages.

5. The system of claim 1, further comprising a receiver clock compensation logic circuit for generating the compensated receiver clock signal.

6. The system of claim 1, further comprising a negative edge detector, connected to the nibble counter, for detecting a negative edge of at least one of the first and second data messages.

7. The system of claim 6, wherein the nibble counter is reset and one or more values stored therein are stored in the accumulator by the negative edge detector when the negative edge of at least one of the first and second data messages is detected.

8. The system of claim 1, wherein the accumulator is reset when a calibration pulse is detected in at least one of the first and second data messages.

9. The system of claim 1, wherein the first and second data messages are transmitted using single edge nibble transmission (SENT) protocol.

* * * * *